(No Model.) 6 Sheets—Sheet 2.

JUAN FERRER Y GIRBAU.
AUTOMATIC PHOTOGRAPHIC APPARATUS.

No. 551,206. Patented Dec. 10, 1895.

Fig. 2.

WITNESSES:
George Baumann
J. C. Connor

INVENTOR
Juan Ferrer y Girbau
BY
Howson and Howson
his ATTORNEYS.

(No Model.) 6 Sheets—Sheet 3.

JUAN FERRER Y GIRBAU.
AUTOMATIC PHOTOGRAPHIC APPARATUS.

No. 551,206. Patented Dec. 10, 1895.

WITNESSES:
George Baumann
J. C. Connor

INVENTOR
Juan Ferrer y Girbau
BY
Howson and Howson
his ATTORNEYS.

(No Model.) 6 Sheets—Sheet 4.

JUAN FERRER Y GIRBAU.
AUTOMATIC PHOTOGRAPHIC APPARATUS.

No. 551,206. Patented Dec. 10, 1895.

WITNESSES:
E. J. Griswold
S. C. Connor

INVENTOR
Juan Ferrer y Girbau
BY
Howson and Howson
ATTORNEYS (No Model.) 6 Sheets—Sheet 5.

JUAN FERRER Y GIRBAU.
AUTOMATIC PHOTOGRAPHIC APPARATUS.

No. 551,206. Patented Dec. 10, 1895.

WITNESSES:
George Baumann
S. C. Connor

INVENTOR
Juan Ferrer y Girbau
BY
Howson and Howson
his ATTORNEYS.

(No Model.) 6 Sheets—Sheet 6.

JUAN FERRER Y GIRBAU.
AUTOMATIC PHOTOGRAPHIC APPARATUS.

No. 551,206. Patented Dec. 10, 1895.

WITNESSES:
E. J. Griswold
C. Connor

INVENTOR
Juan Ferrer y Girbau
BY
Howson and Howson
ATTORNEYS.

UNITED STATES PATENT OFFICE.

JUAN FERRER Y GIRBAU, OF BARCELONA, SPAIN.

AUTOMATIC PHOTOGRAPHIC APPARATUS.

SPECIFICATION forming part of Letters Patent No. 551,206, dated December 10, 1895.

Application filed December 29, 1894. Serial No. 533,342. (No model.) Patented in Spain April 23, 1894, No. 15,759.

*To all whom it may concern:*

Be it known that I, JUAN FERRER Y GIRBAU, a subject of the King of Spain, residing in Barcelona, Spain, have invented certain Improvements in Automatic Photographic Apparatus, (for which I have obtained a Spanish patent, dated April 23, 1894, No. 15,759,) of which the following is a specification.

This invention relates to automatic photographic apparatus, its distinguishing features being certain novel devices and arrangements whereby precision is insured in all the movements which the operation of such cameras involves, while at the same time facilities are afforded for the quick and economical production of photographs.

My invention will be best understood by reference to the accompanying drawings, in which—

A camera constructed according to this invention and which is shown in the drawings, both in its general combination and in its detail, comprises the following features: clockwork for operating the various parts of the mechanism, releasing mechanism adapted to be set in motion or "freed" by the weight of a coin and thereby to allow the camera to perform its operation, a receptacle or magazine for containing sensitized plates ready to receive photographic impressions, a dark-chamber or camera obscura in which photographic images are impressed upon the successive plates, a receiving and conveying carriage for the impressed negative plates, a series of basins or baths wherein the plates are treated with suitable chemicals, an object-glass capable of being closed by an automatic shutter, and an index or recording device adapted to notify and count the operations performed by the camera. The whole of these parts are inclosed in a suitable casing, of wood or other material, which may be constructed and finished or decorated in any desired style. Upon the front face of this casing the following parts are arranged in conspicuous positions: the index-dial situated at the top, the objective fitted with its shutter, a button or knob implanted in a dial and having an index-hand attached to it, whereby the time during which the person or object to be taken shall remain in front of the objective may be varied at will, an aperture or slot for the insertion of coins, each of which is intended to free the machinery by its weight and thus to cause the camera to act, an orifice for the exit of the photographs upon their completion, and the square for winding up the clockwork.

I will now proceed to describe each of the essential parts and devices of the improvements of the automatic camera in succession.

Figure 1:
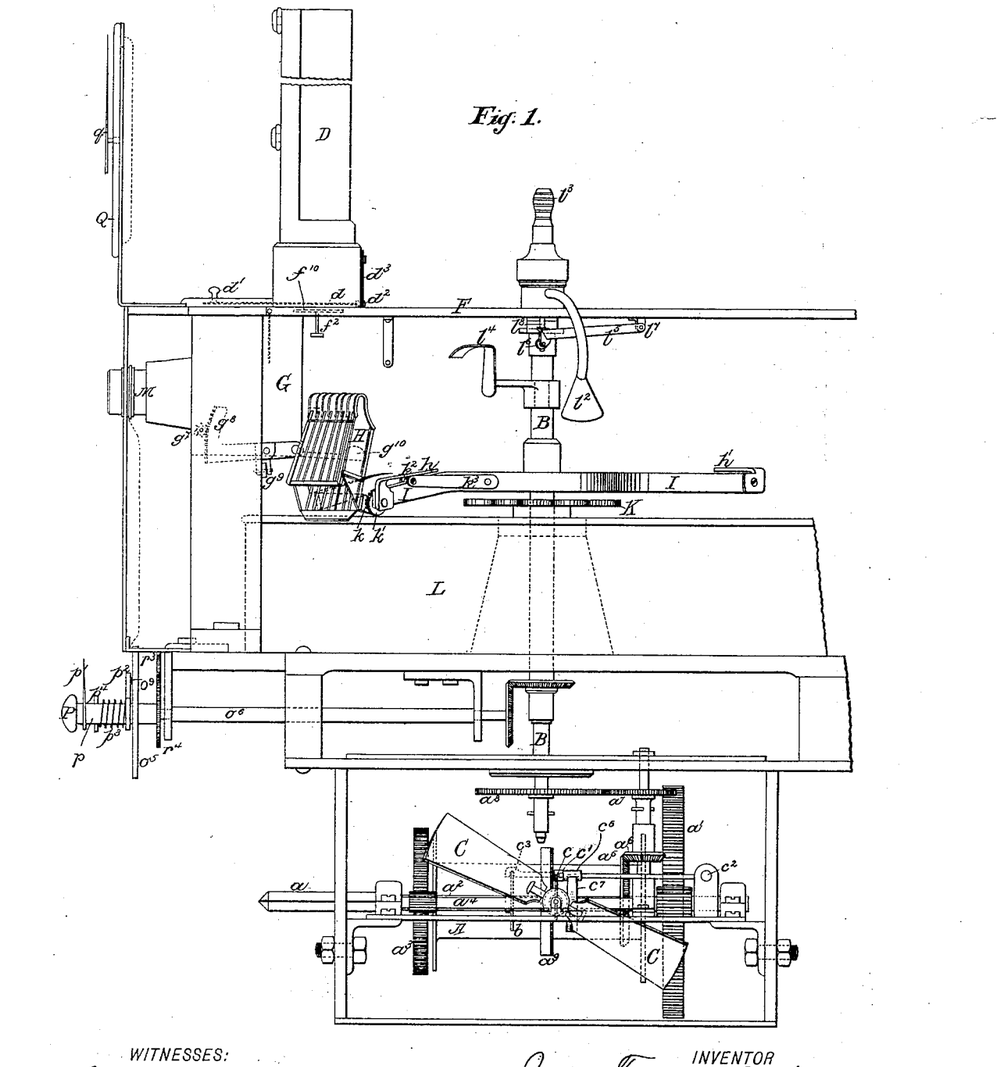
Figure 1 is a side elevation of the mechanism of the camera, the outer casing and woodwork being omitted.
Figure 2:
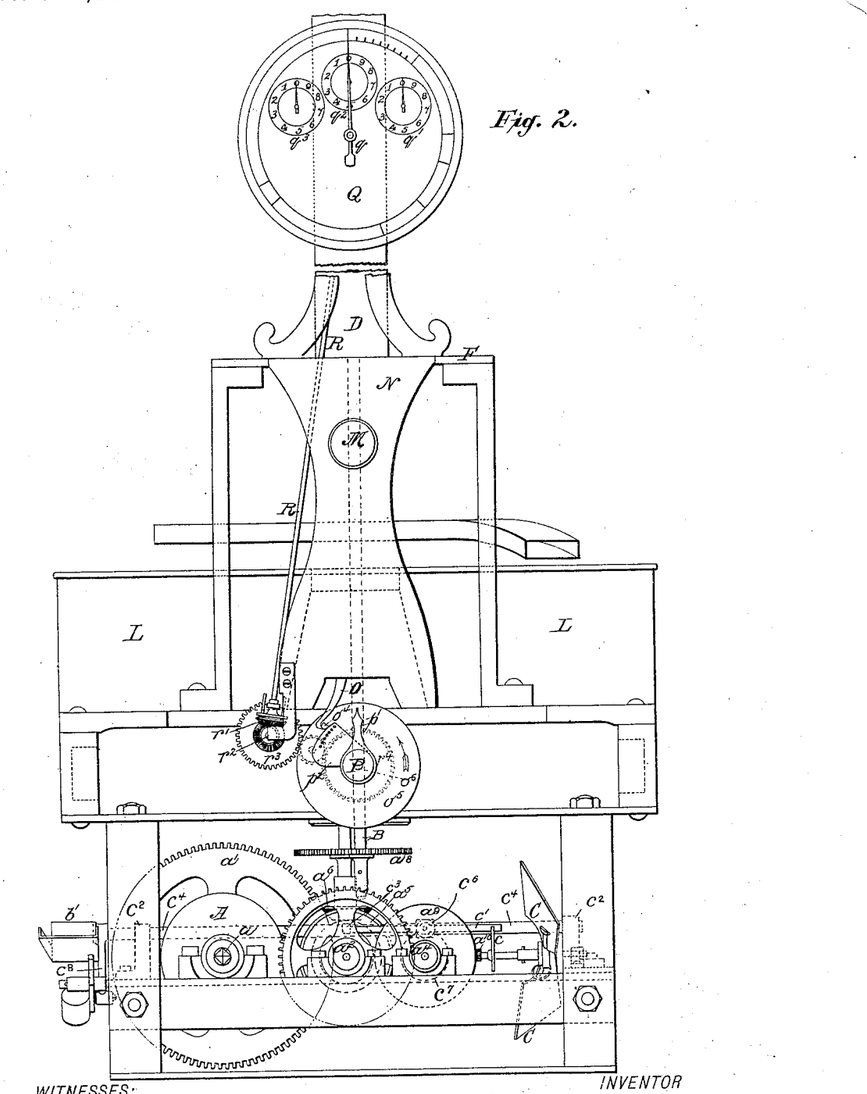
Fig. 2 is a front elevation of the said mechanism.
Figures 11, 12, 13, 14, 15, 16, 17:
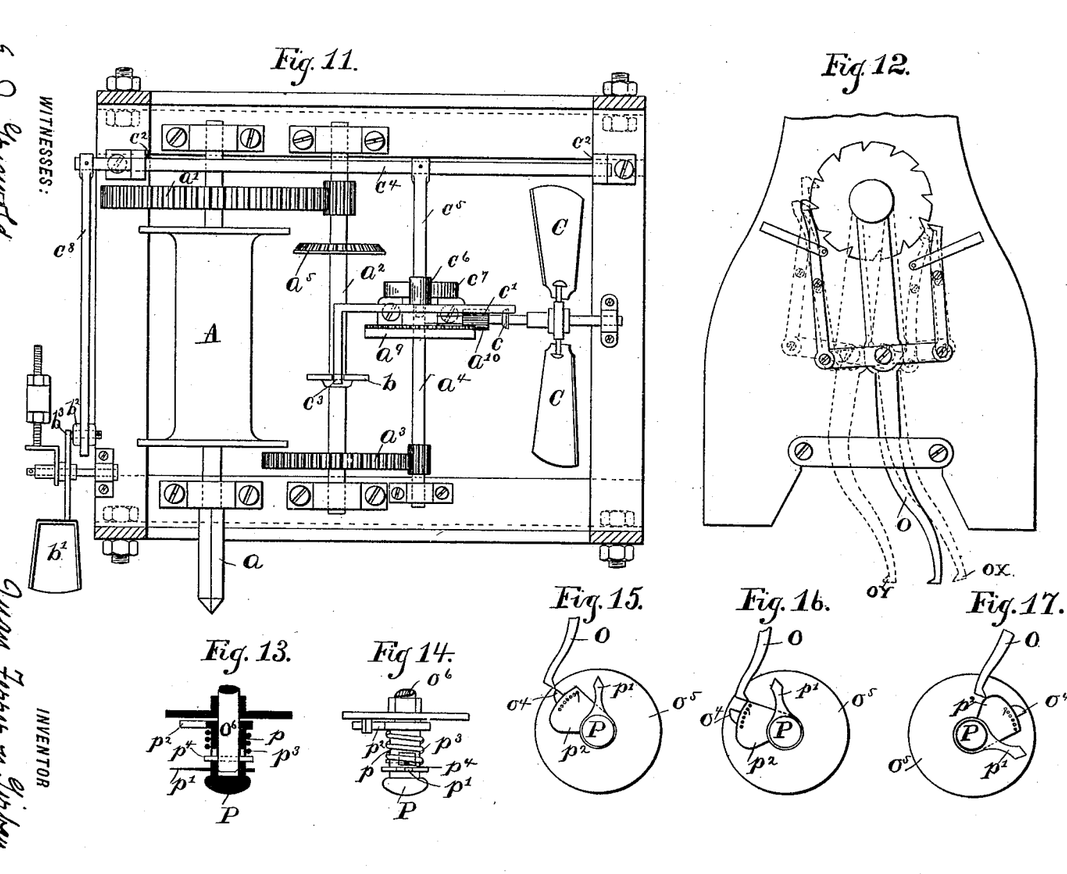
Fig. 11 is a plan of the clockwork mechanism.
Figs. 12 to 17 are details of the shutter-operating mechanism.

*Clockwork.*—This consists of a roller or drum A, Figs. 1, 2, and 11, on which the cord of the operating-weight is wound and the spindle of which terminates in a square $a$, whereby the said weighted cord is wound up. To this drum A is also secured a toothed wheel $a'$, which, through the medium of a pinion, sets in operation a spindle $a^2$ on which a toothed wheel $a^3$ is firmly secured, which wheel $a^3$ in its turn operates a spindle $a^4$ through the medium of another pinion. Upon the spindle $a^2$ of the toothed wheel $a^3$ there is wedged or firmly secured a bevel-pinion $a^5$, which is in gear with another bevel-pinion $a^6$, integral with a toothed wheel $a^7$, gearing with another toothed wheel $a^8$, which is keyed or otherwise firmly secured to the central vertical shaft B. On the same spindle $a^2$ there is keyed a disk $b$, to which I shall refer more fully farther on. Upon the spindle $a^4$ there is fixed a crown-wheel $a^9$ in gear with a pinion $a^{10}$, on the spindle of which is mounted the regulating-flier C.

*Engaging and disengaging mechanism.*—The "coin-freed" mechanism comprises, as shown in Figs. 1, 2, and 11, a small swinging plate or dish $b'$, properly balanced by means of a counterweight and upon which the coin inserted into the apparatus drops after passing through the chute or channel provided for the purpose, but not shown in the drawings. The connection between the swinging dish $b'$ and the clockwork mechanism is made as follows: A shaft $c^4$, Figs. 2 and 11, pivoted at $c^2 c^2$, has fixed to it two arms $c^5$ and $c^3$. The lift-arm $c^5$ is formed in one with the rod $c'$, and is provided with a roller $c^6$, which engages in a notch in a disk $c^7$, fixed to the spindle $a^4$ when the apparatus is at rest. The arm $c^8$ rests freely on a roller $b^2$, carried by the tail-piece $b^3$ of the rod carrying the rocking dish $b'$. The rod $c'$, fixed to the lift-arm $c^5$, as before mentioned, is L-shaped, the arm $c^3$ engaging in a notch in the disk $b$, which is fixed to the spindle $a^2$. The arm $c'$ engages, while the apparatus is at rest, with a finger $c$, carried by the spindle of the flier C. By reference to Fig. 11 it will be seen that the spindle $a^4$ turns at a much greater speed than the spindle $a^2$. When the coin is dropped into the rocking dish $b'$, the dish is lowered and the tail-piece $b^3$ raised. This raises the lever $c^8$, resting on the roller $b^2$, which turns the shaft $c^4$ in its bearing $c^2 c^2$. Consequently the lift-arm $c^5$, with its roller $c^6$, is raised, carrying with it the L-shaped rod $c' c^3$. The disks $b$ and $c^7$ are thus released, and the clockwork mechanism is allowed to act under the influence of its cord and weight. The spindle $a^4$, turning at a greater speed than the spindle $a^2$, the roller $c^6$ maintains the system of levers raised during the time necessary for the disengagement of the arm $c^3$ from the notch of the disk $b$. The roller $c^6$ and its disk $c^7$ are known in horology under the name of "detent." The clockwork continues in operation until the disk $b$ has performed a complete revolution, and the arm $c^3$ enters the notch of this disk, causing the rod $c'$ to be lowered and the mechanism to be in consequence stopped. It will be seen, however, that this mechanism is capable of imparting to the central vertical shaft B one revolution only at each operation.

*Plate-magazine.*—The sensitized plates are superposed in a pile within a vertical channel or shaft D, Figs. 1, 2, 3, and 4, closed in front by a tightly-fitting door and the lower portion of which is provided with a sliding damper or shutter $d$, carrying a button or knob $d'$ for its operation by hand. Plugs $d^2$, subjected to the action of a spring $d^3$, pass into the slideways of the damper $d$ in the rear, when such damper is moved up to the front to prevent the sensitized plates from catching in the said slideway. The object of the damper $d$ is to close the plate-magazine below while such magazine is carried to its proper position in the camera, and also to afford a passage for the plates when it is drawn forward. On being drawn to the front the said damper or shutter $d$ closes the camera G at the top, while owing to its introduction into the upper slideways of the said camera it effectually prevents the magazine from being removed at any but the proper times. When the magazine is in position in the apparatus, there is below it a carriage adapted to conduct it into the dark-chamber of the camera G the sensitized plate situated in the lower portion of the magazine. The carriage (see Figs. 3 and 5) consists of two parts $e$ and $e'$, hinged at $e^2$, and is connected by a rod E to a crank $e^8$, keyed on to the shaft B. By such means it is made capable of a reciprocating sliding motion within the thickness of the plate F, provided with suitable perforations or made in open work, and whereon the said carriage is guided by means of rollers $f$ and $f'$. While the apparatus is at rest, one part $e$ of the carriage is situated under the plate-magazine, its level being slightly lowered for the reception of the lower plate, while the other part $e'$ is plane, and when the carriage is driven forward, adapted to close the magazine at the bottom. While the carriage is in motion, the lowered or depressed portion $e$ forms simply an extension (on the same level) of the other part $e'$, being supported in this position by the arm of a spring $e^3$ placed underneath, but as soon as this spring-arm meets the slot or recess $e^4$, Fig. 5, with which it is provided on one side, it is immediately lowered and thereby caused to deposit the plate, which it carries upon a plate or blade $g$, Fig. 6, arranged within the dark-chamber G of the camera. In addition to this the part $e$ of the carriage is perforated in the center, the perforation $e^5$ being provided for the purpose of a small plate $f^{10}$, fitted with a button and stud $f^2$ at its lower part, Fig. 1, which should be pressed upward to cause the plates to rise into the magazine again and to allow the said magazine to be closed by means of the damper or shutter $d$, so that it may be removed without exposing the plates which it contains to the light of day and without the possibility of any one of the plates slipping out.

*The dark-chamber or camera proper.*—The dark-chamber G, Figs. 1 and 6, situated below the above-mentioned magazine, carries at its upper part a roller or cylinder $g'$, whereon the plate-distributing carriage above referred to is adapted to travel. The roller or cylinder $g'$ is supported by springs $g^2$ in such a manner that the longitudinal displacement of the said carriage may take place without meeting with any resistance whatever. Within this chamber is arranged the plate or blade $g$, upon which the part $e$ of the carriage leaves the plate taken from the magazine, which plate is caused by a guide or sheath $g^3$ always to descend to the same position. The plate-receiving blade $g$ is mounted upon a spindle $g^4$, which at one of its ends carries a toothed disk $g^5$, in gear with a pawl $g^6$, while its other end carries a pinion $g^7$, gearing with a toothed segment $g^8$. This segment carries a roller or cylinder $g^9$, upon which are adapted to act inclines $h$ and $h'$, Figs. 1 and 3, of the impressed plate-feeding carriage I, hereinafter referred to, while the tail-piece $g^{10}$ of the pawl $g^6$ is in due course acted upon by an incline $h^2$, Figs. 3 and 7, which is likewise attached to the feeding or conveying carriage. The object of the incline $h$ is by passing over the segment $g^8$ to cause the blade $g$ to change from its lower position $g^a$ (shown in dotted lines, Fig. 6) to an oblique position, (indicated in full lines in Fig. 6,) while the incline $h'$, as it also acts upon the said segment $g^8$, is intended to cause the blade $g$ to move out of the inclined position just referred to and to assume the vertical position $g^b$ in front of the object-glass, as shown in dotted lines in Fig. 6. The object of the incline $h^2$ in acting upon the tail or heel $g^{10}$ of the pawl is to set free the blade $g$ and to allow the same to resume the lower position $g^a$ by its own weight.

Figure 6:
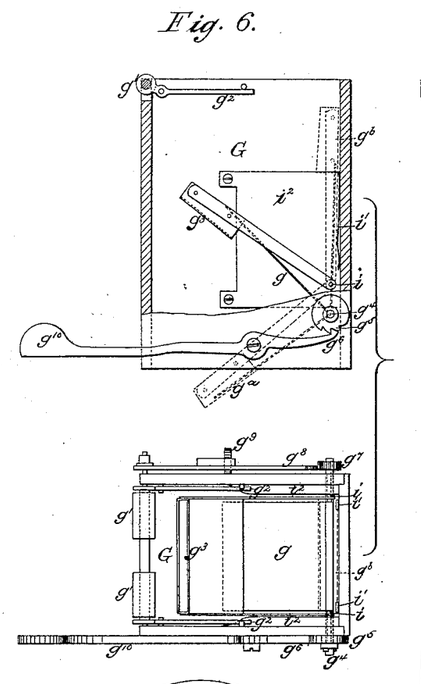
Fig. 6 is a detail plan and a vertical section of the camera obscura.

In the position drawn in full lines in Fig. 6 the blade $g$ is shown in readiness for the reception of a sensitized plate, whereas in the position $g^b$, which the same figure shows in dotted lines, the blade is supposed to have brought the said sensitized plate in front of the objective to enable it to receive a photographic impression. Again, in the position $g^a$, also delineated in dotted lines, the blade is supposed to drop the imperfect plate into a receptacle H, hereinafter referred to. The blade $g$ is combined with a guide or sheath $g^3$, located at its end and the center of oscillation or fulcrum $i$ of which is eccentric in relation to the pivot of oscillation $g^4$ of the said blade $g$. This eccentric situation has the result that in the position drawn in full lines the top part of the sensitized plate, which has dropped from the part $e$ of the carriage onto the blade $g$, rests against the outer part of the guide $g^3$, and that as soon as the blade has risen to its vertical position to enable the plate it carries to receive an impression the guiding-sheath $g^3$ assumes a more elevated position, thereby permitting the plate to rest entirely upon the said blade $g$. Under these circumstances, as the blade $g$ and the guide $g^3$ descend the sensitized and impressed plate passes into the guide-sheath, and in order to be able to leave the dark-chamber or camera proper will be obliged to pass through the guiding-sheath $g^3$, which will convey it directly into the receptacle H.

At $i'$, Fig. 6, there are springs, the object of which is to press the sensitized plate against the blade carrying it while it is in front of the object-glass, and to resist any tendency of such plate to shift out of position. Upon the inner side of the camera there are also provided springs $i^2$, which guide the plate during its descent to the blade $g$, when the blade is in the position shown in full lines, and cause it to drop in the position to enter the sheath $g^3$ at the proper time.

*The impressed-plate receiving and feeding carriage.*—The impressed plates as they leave the dark-chamber or camera proper drop into the receptacle H, provided for the purpose at the end of a carriage I, mounted upon the vertical central shaft B and turning therewith. This carriage, Figs. 1, 3, 7, and 8, is adapted to carry the impressed plates from one bath to the next, and the said receptacle H is so arranged as to rise and sink according as it is required to deliver plates in any one particular bath. This receptacle is secured to a cross-piece $k$, which, through the medium of toothed wheels $k'$ and $k^2$, a connecting-piece $k^3$, and a fork $k^4$, properly guided upon the carriage at $k^5$ and provided with a stud or pin $k^6$, is subjected to the action of a fixed cam K for the purpose of causing the said receptacle H to turn round to the position in which it can receive the impressed plates, and to immerse such plates into the several baths, as shall be explained more fully hereinafter.

Figures 5, 8:
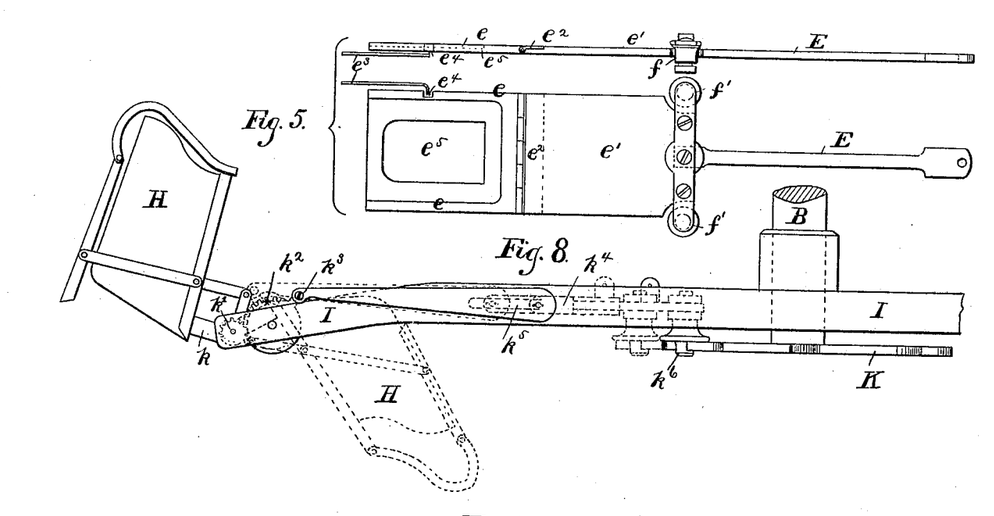
Fig. 5 is a detail plan and elevation of the device adapted to convey the sensitized plates from the magazine to the camera obscura.
Fig. 8 is a detached view of the receptacle for containing the plates after they have received the photographic impression.

It will be understood that the raised or recessed portions or indentations of the fixed cam K act each in succession upon the receptacle H, carried round in a circle from right to left by the carriage I, keyed on the shaft B, as it turns or swings round. Upon the shaft $k^{10}$, on which the cross-piece $k$ is pivoted, is passed a spring $k^7$, one end of which is fixed to one arm of the carriage I, and the other to the said cross-piece $k$, in such a manner that the pin or stud $k^6$ always continues in contact with the fixed cam K.

Figure 7:
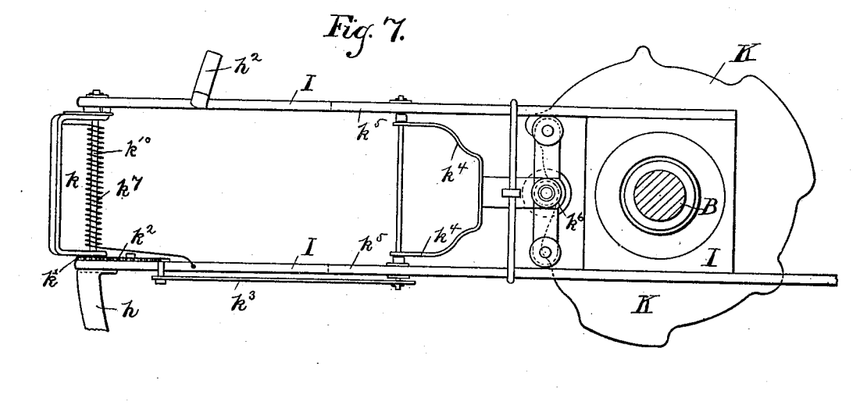
Fig. 7 is a sectional plan and elevation of the carriage for conveying the impressed plates to the different chemical baths.

The carriage I carries in front the inclines $h^2$ and $h$, and in the rear, upon the extension of one of its arms, the incline $h'$, mentioned above. It will be noticed that the incline $h^2$, which serves to free the blade $g$, carrying the impressed plate, is provided with a shoulder, so that the said blade is turned down in two successive strokes or movements, so as to insure the engagement of the plate in the guiding sheath or channel $g^3$, which is to insure its due delivery into the receptacle H.

*Baths of chemicals.*—Below the plane of motion or revolution of the carriage I there are arranged the requisite number of baths for the impressed plates, each in succession to be plunged into and treated with the usual chemicals. In a circular basin L, filled with water for washing, Figs. 1, 2, and 3, there are provided two separate hollow spaces or compartments $l\,l'$, Fig. 3, one of which contains the developing or image-disclosing solution and the other the fixing-solution. Above the carriage there is a water-jet $l^2$, Fig. 1, fed from a reservoir located at the upper part of the apparatus and connected to the jet by an india-rubber tube fitted to the nipple $l^3$, below which a distributing-valve is arranged.

Upon the central vertical shaft B there is secured an incline $l^4$, Fig. 1, which as it turns is intended to act through the medium of the lever $l^5$, carrying a roller $l^6$ and pivoted at $l^7$ upon the rod $l^8$ of the valve situated below the nipple $l^3$ and having for its object to supply the jet in question with water. The overflow liquid from the circular basin L is discharged through a suitable orifice into a removable receiver situated at the lower portion of the apparatus.

Figure 3:
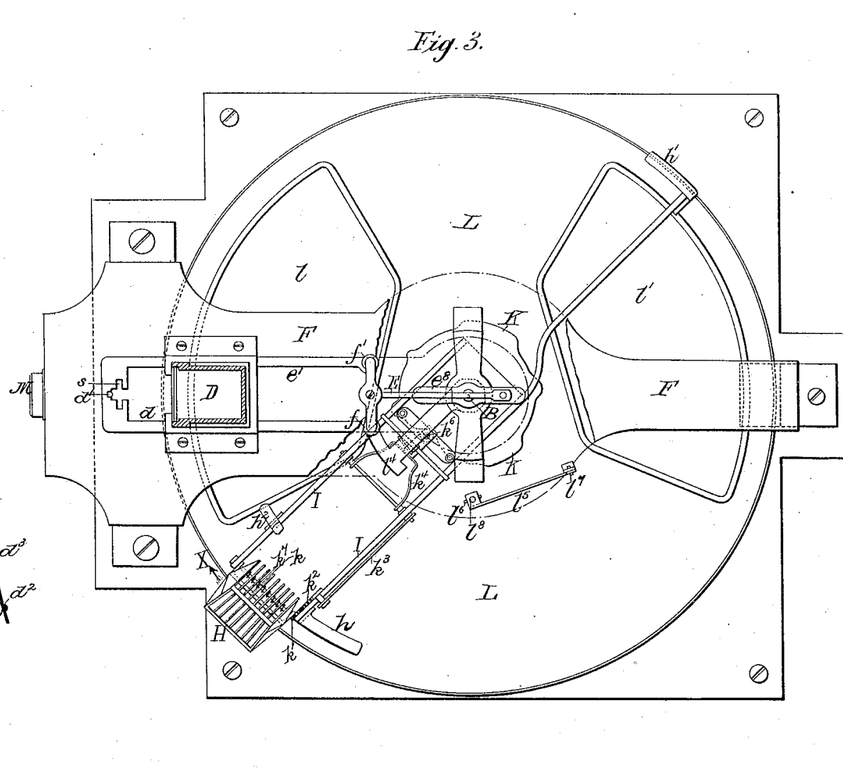
Fig. 3 is a sectional plan view.
Figure 4:
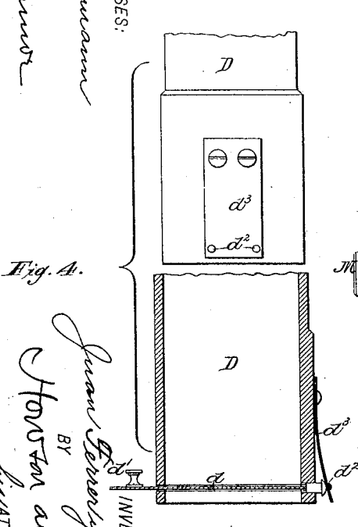
Fig. 4 is a detail view of the lower part of the chamber or magazine for the reception of the sensitized plates.

*Objective and automatic shutter.*—The objective or object lens is distinguished by no particular optical feature, it being as usual a compound lens or a combination of lenses arranged in an ordinary manner within a tube M, Figs. 1, 2, and 3, opening into the camera proper or dark-chamber and having the shutter arranged in front of it, with the operating mechanism of the same mounted upon a plate N. This mechanism (drawn to a full size in Fig. 9) consists of the pivoted shutters $m\ m'$, which in opening move respectively to the right and left, each being secured for the purpose to two toothed wheels $n\ n'$, geared together so as to insure uniformity of motion of the two shutter halves, each being fitted with finger-pieces or keys $t\ t'$. One of the said wheels—say the wheel $n'$, for example—is made capable of being locked in position by a spring $s'$, which thus secures the shutters in place, both when open and when closed. Below these shutters there is arranged a disengaging-lever O, capable of swinging on a pivot $o$ and provided with the following parts: a ratchet-wheel $m^2$ and a toothed wheel $s$, keyed upon the same shaft or spindle; on a second spindle a double wheel $m^3\ m^4$, pawls $m^5\ m^6$, pivoted at $n^5\ n^6$, respectively, and exercising pressure upon the wheel $m^3$ under the influence of a spring $n^2$, so that they do not allow more than one tooth to move past them at a time. The wheel $m^3$ and $m^4$ are separated by a spring-barrel, the spring contained in which causes them to turn from the left to the right, such spring being constantly compressed by levers $n^3$ and $n^4$, pivoted at a fixed point and acting upon a locking or arresting mechanism integral with the spring-barrel. Stops $o'\ o^2$ limit the extent of motion of the rods or pawls $m^5\ m^6$, respectively, of the wheel $m^3$, according as the lever O oscillates in one direction or the other. This lever is constantly drawn back to one side, Fig. 9, by the spring $o^3$. Moreover the wheel $m^4$ is in gear with the wheel $s$. The lever O is set in operation, as shown in Fig. 2, (see also Figs. 12 to 17,) by means of a stop or tappet $o^4$, belonging to a disk $o^5$, which is keyed upon a spindle $o^6$ and receives motion through the medium of a pair of bevel-wheels from the central vertical shaft B. (See Fig. 1.) While the said stop or tappet $o^4$ is being operated, the time of exposure, during which the two shutter halves remain open, is not variable. In order to make it so, the following mechanism has to be employed: On the front of the spindle $o^6$, Figs. 1, 2, and 13 to 17, there is passed a sleeve $p$, carrying a button or knob P, protruding on the outside of the apparatus, and also an index-hand $p'$, adapted to turn in front of the exposure-dial. The said sleeve $p$ is provided at its inner end with a segment $p^2$, which, under the influence of a spring $p^3$, constantly presses upon the disk $o^5$. This sleeve $p$, by means of a slot traversed by a peg $p^4$, carried by the shaft $o^6$, and affording a support to the spring $p^3$, may be drawn forward and turned to the right or to the left on the spindle $o^6$. This segment $p^2$ (in one with the sleeve $p$) is provided with a series of perforations in which is adapted to engage a pin $o^9$, Figs. 1 and 14, extending from the disk $o^5$. By this arrangement the sleeve $p$ may be drawn forward, compressing the spring $p^3$ and withdrawing the segment $p^2$ from engagement with the pin $o^9$ on the disk $o^5$. The sleeve is then turned more or less to the right or left, according to the time of exposure required. The sleeve is then released and the spring $p^3$, pressing the segment $p^2$ against the disk $o^5$, causes the pin $o^9$ to enter the perforation in the segment nearest it.

Figure 9:
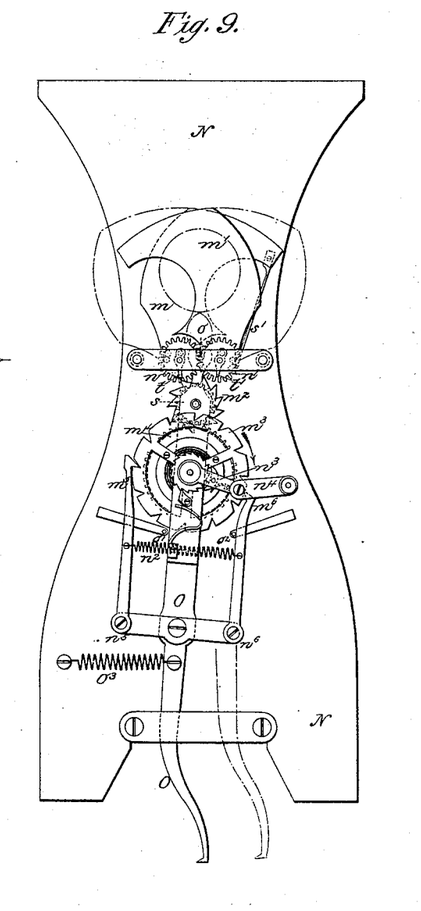
Fig. 9 is a detail view of the mechanism operating the automatic shutter, as seen from the rear.

Referring to Figs. 2, 15, 16, and 17, which show the device in front view, and Figs. 9 and 12, which show it from the opposite side, the lever O, when not in contact with the segment $p^2$, is in the position shown in Fig. 9 in full lines and in the dotted position $o^y$, Fig. 12. As the disk $o^5$ rotates and the segment $p^2$ comes in contact with the lever O, the lever is carried over to the position shown in full lines in Fig. 12, (also shown in this position in Fig. 2.) When projection $o^4$ hits the lever O, it raises it to the position shown in dotted lines at $o^x$, Fig. 12, and also shown in Fig. 15. The position of the lever when resting on the part of the segment behind the projection $o^4$ is the same as that when it rests on the part ahead of the projection—that is, in full lines in Figs. 2 and 12. As the relative position of the segment $p^2$ to the stop $o^4$ on the disk $o^5$ may be adjusted at will, as described, and thereby a course or way of greater or less extent may be formed behind the stop $o^4$ on the segment, the heel of the lever O may be retained for a greater or less space of time, and consequently the shutter may be kept open more or less long. This retention of the shutter in the open position may last from one to three seconds, the duration of the time of exposure being indicated by the above-mentioned hand $p'$ upon the exposure-dial.

Figure 10:
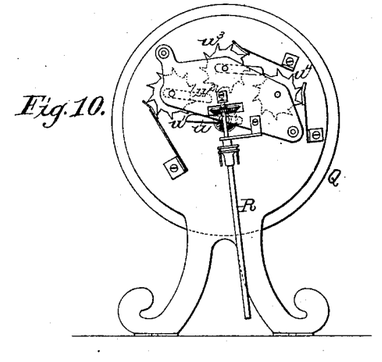
Fig. 10 is an elevation of the index and counting device, also viewed from the rear.

*Indicating and counting mechanism.*—The apparatus is provided at its upper part with a dial Q, Figs. 1 and 2, in front of which an index-hand $q$ may be arranged to revolve. The dial has words—such as "Exposure," "Developing," "Washing," "Fixing," and "Water-jet"—inscribed on it in a circle. In the center there are located the dials $q'\ q^2\ q^3$ of a counting device. Behind the dial, Fig. 10, is arranged a mechanism consisting of an inclined spindle R, which, through the medium of two pairs of bevel-wheels $r\ r'$, Fig. 2, operates the arbor carrying the index-hand $q$, placing it in connection with a spindle $r^2$, situated in the vicinity of the spindle $o^6$, which has been referred to in the part of this specification relating to the mechanism for adjusting or controlling the time of exposure. Upon this spindle $r^2$, Fig. 2, there is also mounted a gear-wheel $r^3$, which through the medium of an intermediate wheel (or idler) is in gear with the wheel $r^4$, keyed upon the spindle $o^6$, which, by its rotary motion and through the agency of the intermediate gearing mentioned above, imparts rotary motion to the hand $q$, which indicates what stage of operation the photograph is going through at any given moment and consequently the condition in which the impressed plate is for the time being. The bevel-wheel wedged upon the spindle or arbor of the hand $q$ and gearing with a bevel-wheel on the upper end of the spindle R carries a finger $u$, Fig. 10, which comes in contact with the wheel $u'$, to cause this wheel to move forward one tooth's space at each revolution of the hand $q$ for the purpose of recording upon the dial $q'$ the units or individual operations as they are completed. This wheel $u'$ also carries a finger $u^2$, engaging with a similar wheel $u^3$ for the purpose of marking the tens upon the dial $q^2$, and in a similar manner motion is imparted to the wheel $u^4$ to register the hundreds upon the third dial $q^3$.

*Preparing the apparatus for use.*—(a) The upper reservoir which serves to feed the jet $l^2$ is filled with water.

(b) The plate-carrying blade $g$ is lowered by the operation by hand of the heel or tail piece $g^{10}$ of the pawl $g^6$. Then a plate of ground glass is inserted into the slide $s$, Fig. 3, situated in front of the dark-chamber or camera proper G behind the object-lens M, and, lastly, the shutter is opened by the action of the lever O, also operated by hand. The objective is then properly focused in the well-known manner, the shutter closed again, and the ground glass removed.

(c) The magazine D, previously filled with a batch of sensitized plates, is placed in position. The damper or shutter $d$ is then pulled by means of the knob $d'$, whereby the plates are caused to descend upon the portion $e$ of the feeding device and at the same time to fix the magazine and also to close the camera at the top.

(d) The basins or baths $l$ $l'$ are filled with developing and fixing solutions, respectively, and the basin L is filled with water.

(e) The weight of the clockwork is wound up by means of a key fitted upon the square end $a$ of the arbor and turned in the required direction.

(f) The button P is acted upon so as to regulate the time during which the shutter shall remain open, such time varying in accordance with the weather or the nature of the light available.

(g) A coin is now inserted into the slot provided for the purpose, and as it drops upon the swinging lever $l'$ it releases the clockwork, thereby causing the parts of the mechanism to assume their operative positions.

As the mechanism thus performs what may be described as an "idle" movement, the plate-feeder, situated below the magazine D, carries the lowermost plate that such magazine contains along with it and moves it up to a position in front of the camera, where, in consequence of the part $e$ of the carriage being depressed, it drops upon the blade $g$. Immediately after this descent of the sensitized plate upon the said plate $g$ the feeding-carriage I acts by means of its incline $h'$ upon the toothed segment $g^8$, which causes the said blade $g$ to rise up to the vertical position and thereby to bring the sensitized plate which it carries up to the proper position for exposure in front of the object-glass, the shutter for the time being remaining closed. As soon as the movement of the carriage I has been completed, the clockwork is arrested again, as has been explained above, when the several parts of the mechanism will occupy the positions shown in the drawings. The apparatus is now ready for use.

*Operation of the apparatus.*—The person or object to be photographed is placed in front of the camera at a predetermined distance therefrom, so that the same is precisely focused. The coin is then inserted into the slot provided for its reception, whereupon the apparatus will operate in the following manner: By the weight of the coin the clockwork is freed, as hereinabove explained, and the central vertical shaft B is caused to complete a revolution about its own axis and to operate the various parts with which it is connected. These several parts accordingly act in the following order and manner:

(a) The stop $o^4$ of the rotary disk $o^5$, which when the camera is at rest retains the lever O in the position wherein it is shown in Fig. 2, and in full lines in Fig. 12, acts upon this lever as soon as the mechanism of the camera is set in motion and shifts it to the position shown in dotted lines at $o^x$ in Fig. 12. In this position the pawl $m^5$, arrested by the fixed stop $o'$, is disengaged from the wheel $m^3$, and yielding to the action of the spring contained in the barrel, begins to revolve and continues in motion until stopped by the pawl $m^6$. As the said wheel $m^3$ thus moves one tooth's space, it carries along with it the wheels $s$ and also, consequently, the ratchet-wheel $m^2$. This ratchet-wheel acts by its teeth upon the key $t'$, forming part of the wheel $n'$, which in consequence rotates, taking round with it the wheel $n$. The movement of the wheels $n'$ and $n$ causes the shutters $m$ and $m'$ to move apart and to remain open so long as no operation of the mechanism causes them to be closed, but when the lever O is released by the tappet $O^4$, and when it does not meet the segment $p^2$ behind such a tippet, the said lever O, under the influence of the spring $o^3$, will resume the position shown in full lines in Fig. 9 and in dotted lines at $o^y$ in Fig. 12, and the pawl $m^6$, stopped at $o^2$, in its turn releases the wheel $m^3$, allowing it to revolve until it comes into engagement with the pawl $m^5$, which by that time has been set free. As it thus performs a movement equal to one toothed space (which movement always takes place in the same direction) the said wheel $m^5$ takes round the wheel $s$ and also the ratchet-wheel $m^2$, which therefore is enabled to act upon the key $t$ of the wheel $n$, thus causing the latter to revolve in the opposite direction. Now as the wheels $n$ and $n'$ are in gear with each other, and as the shutter halves are fixed thereon, it follows that they resume the "closed" position. The time during which the shutters remain open and conversely the time during which the light is shut out, therefore, depends upon the time during which the lever O remains dependent upon the action of the tappet or stop $o^4$ and the segment $p^2$.

It will be readily understood that the duration of the time of exposure may vary according to the position given to the segment in relation to the disk $o^5$. Thus, for example, when the edge of the segment $p^2$ is level with the tappet $o^4$, the lever O will be entirely free and the instantaneous closing of the shutter will be the result, whereas, when the said segment projects behind the said tappet, as indicated in Figs. 2, 15, 16, and 17, the lever O will be retained by the segment until the latter allows it to escape, and in the meantime the shutter will remain open. In any case the light will act upon the plate contained in the dark-chamber or camera proper during the time that the two half shutters $m$ and $m'$ remain apart or open.

(b) The moment the sensitized plate has received the photographic impression or image and the shutter is closed the feeding-carriage I comes into its position underneath the camera to receive the impressed plate in its receptacle H, which, under the action of the fixed cam K, plunges, with its aperture turned upward, as shown in Fig. 8 in dotted lines, into the bath $l$. At this precise moment the incline $h^2$ acts upon the heel $g^{10}$ of the pawl $g^6$, by which releasing action it turns down the blade $g$ in two successive movements or strokes. The last stroke brings the blade to the position $g^a$, thereby permitting the impressed negative to drop into the said receptacle H, and inasmuch as this receptacle happens to be then immersed in the developing-bath $l$ the photographic image is disclosed and becomes clearly visible.

(c) The carriage I, as it continues to turn in the direction of the arrow X, Fig. 3, at a certain period of its movement, brings its incline $h$ into coincidence with the segment $g^8$. The incline accordingly raises the segment and thereby causes the blade $g$ to return to its inclined position, in which it is ready to receive a fresh plate brought up to it from the magazine D by the plate-feeder $e$.

(d) The moment the carriage arrives at the extremity of the bath $l$ the fixed cam K, through the medium of the gearing above described, acts upon the receptacle H, which at that time happens to be lifted out of the said bath, and causes it directly afterward to plunge into the basin L containing the water for washing.

(e) The carriage, as it continues to move in the same direction, arrives at the fixing-bath $l'$, and at that moment the cam K again raises the receptacle H and causes it to plunge in the said bath $l'$, where the impression upon the developed and washed negative is fixed.

(f) Upon its arrival at the end of the said bath the receptacle H, being still acted upon by the cam K, is raised and again immersed in the basin L, which contains the water for washing. At that moment the incline $h'$ of the carriage acts upon the segment $g^8$ and through the medium of this segment causes the plate-carrying blade $g$ to rise in the camera, so as to bring a fresh sensitized plate in front of the object-glass, which plate has been supplied from the magazine and delivered to it by the feeder $e$. The apparatus is now in readiness for a fresh operation.

(g) When the receptacle H has traveled a certain distance within the basin L, the cam K raises it so as to submit the developed and fixed negative to the action of the water-jet $l^2$, which by that time is set in operation by the incline $l^4$, acted upon by the distributing-valve.

(h) After the plate has been washed with pure water, the receptacle H, which is still undergoing the action of the cam K, again plunges into the basin L, and then rises. The most depressed portion or the lowest point of the cam K being thus reached, this cam now produces a complete and sudden reversion of the motion of the receptacle H, as shown in full lines in Fig. 8, which releases the plate, leaving it upon an incline, which conducts it to the outside to be delivered to the customer. As it travels along this incline, the plate has ample time to dry.

(i) At this juncture the clockwork comes automatically to rest, owing to the descent of the arm $c^3$ and its engagement in the slot of the disk $b$. The parts of the machine are now ready to start afresh and to perform another operation upon the insertion of another coin.

I claim as my invention—

1. In photographic apparatus, the combination of a shutter and a lever provided with spring and gearing mechanism to operate the shutter, with a rotary disk and a segment to act upon the lever, the relative positions of the said disk and segment being adjustable, substantially as set forth.

2. In photographic apparatus, the combination of a shutter, gearing mechanism and a lever to actuate the shutter, with a rotary disk and a segment to act upon the lever, the said segment being provided with a knob and means for adjusting its position relative to the said disk to regulate the time of exposure, and an index hand to indicate on the outside of the apparatus to what time of exposure the segment has been set.

3. In automatic photographic apparatus, a camera provided with a pivoted blade to receive the sensitized plate, in combination with a pivoted guide to direct the plates when leaving the blade, the pivoting points of the blade and the guide being eccentric, as and for the purpose set forth.

4. In an automatic photographic apparatus, the combination of the camera provided with a pivoted blade to receive the sensitized plate, with a rotary carriage having inclines, and mechanism acted upon by the said inclines to move the said blade into its different positions at certain intervals, substantially as set forth.

5. In an automatic photographic apparatus, the combination of a camera provided with a pivoted blade and a pivoted guide, the pivots of which are located eccentrically, the pivot of the blade being provided with a gear wheel and a ratchet wheel, a toothed segment and a pawl engaging with the said gear wheel and ratchet wheel respectively, with a rotary carriage provided with inclines to act upon the said toothed segment and pawl for moving the said blade into its different positions, substantially as set forth.

6. In a photographic apparatus, the combination of a plate magazine, provided with a shutter adapted to hold the plates in the magazine, with a camera provided with slide ways for the said shutter when pulled out, the said shutter closing the camera and locking the magazine thereto when pulled out into the said slide ways, substantially as set forth.

7. In a photographic apparatus, the combination of a plate magazine, provided with a shutter adapted to hold the plates in the magazine with a camera provided with slide ways for the said shutter when pulled out, the said shutter closing the camera and locking the magazine thereto when pulled out into the said slide ways, the said magazine being also provided with spring actuated plugs $d^2$ as and for the purpose set forth.

8. In an automatic photographic apparatus, the combination of a plate magazine and a camera, with a sliding carriage having a hinged portion provided with a depression to hold a plate and a recess, and a spring arm adapted to support the carriage until it reaches the said recess, substantially as set forth.

9. In automatic photographic apparatus, the combination of a camera having a pivoted plate carrying blade and a rotary carriage carrying a receptacle for the impressed plates, and provided with inclines to act upon the plate carrying blade, with clock work mechanism to rotate the said carriage, substantially as and for the purposes set forth.

In testimony whereof I have signed my name to this specification in the presence of two subscribing witnesses.

JUAN FERRER Y GIRBAU.

Witnesses:
LEVI CRANCKEN,
CLYDE SHROPSHIRE.